(12) United States Patent
Tamura et al.

(10) Patent No.: US 12,529,556 B2
(45) Date of Patent: Jan. 20, 2026

(54) THICKNESS MEASURING DEVICE AND THICKNESS MEASURING METHOD TO MEASURE THICKNESS OF SUBSTRATE

(71) Applicant: Tokyo Electron Limited, Tokyo (JP)

(72) Inventors: Takeshi Tamura, Kumamoto (JP); Munehisa Kodama, Kumamoto (JP); Tomohiro Kaneko, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 377 days.

(21) Appl. No.: 18/044,590

(22) PCT Filed: Aug. 27, 2021

(86) PCT No.: PCT/JP2021/031465
§ 371 (c)(1),
(2) Date: Mar. 9, 2023

(87) PCT Pub. No.: WO2022/054605
PCT Pub. Date: Mar. 17, 2022

(65) Prior Publication Data
US 2023/0341224 A1  Oct. 26, 2023

(30) Foreign Application Priority Data

Sep. 10, 2020 (JP) ................................ 2020-152049
Nov. 27, 2020 (JP) ................................ 2020-196984

(51) Int. Cl.
*G01B 21/08* (2006.01)
(52) U.S. Cl.
CPC ................................ *G01B 21/08* (2013.01)

(58) Field of Classification Search
CPC ........................ G01B 21/08; G01B 2210/44; G01B 2210/42; G01B 11/0683; G01B 11/0691;
(Continued)

(56) References Cited

U.S. PATENT DOCUMENTS 4,755,746 A * 7/1988 Mallory ............. G01R 31/2831
324/719
5,479,108 A * 12/1995 Cheng ....................... G01B 7/06
414/331.14
(Continued)

FOREIGN PATENT DOCUMENTS

JP       H9011121 A     1/1997
JP    2001-110806 A     4/2001
(Continued)

OTHER PUBLICATIONS

International Search Report of PCT/JP2021/031465 dated Nov. 9, 2021.

*Primary Examiner* — Tran M. Tran
(74) *Attorney, Agent, or Firm* — Shih IP Law Group, PLLC.

(57) ABSTRACT

A thickness measuring device configured to measure a thickness of a substrate includes a substrate holder configured to hold the substrate; a measurer configured to measure the thickness of the substrate held by the substrate holder; and a moving mechanism configured to move the substrate holder and the measurer relatively in a horizontal direction. The substrate holder is provided with a notch portion which extends in a diametrical direction from a center of the substrate holder to an outer end thereof, and the measurer is configured to be relatively advanced into or retreated from the notch portion.

11 Claims, 14 Drawing Sheets

(58) Field of Classification Search
CPC ....... G01B 11/0608; G01B 7/06; B24B 49/12; B24B 49/045; B24B 49/05
See application file for complete search history.

(56) References Cited

U.S. PATENT DOCUMENTS

| | | | | |
|---|---|---|---|---|
| 5,670,888 | A * | 9/1997 | Cheng | H01L 21/681 324/750.19 |
| 5,929,983 | A * | 7/1999 | Lu | G01B 11/0608 356/138 |
| 6,014,886 | A * | 1/2000 | Anderson | G01B 5/06 33/502 |
| 6,166,808 | A * | 12/2000 | Greve | G03F 7/70483 250/548 |
| 6,592,673 | B2 * | 7/2003 | Welch | H01L 21/67259 118/728 |
| 6,806,969 | B2 * | 10/2004 | Clifford, Jr. | G01B 11/02 250/559.27 |
| 6,966,816 | B2 * | 11/2005 | Swedek | B24B 37/013 451/6 |
| 7,808,651 | B2 * | 10/2010 | Lian | H01J 37/32935 356/503 |
| 8,337,278 | B2 * | 12/2012 | Palou-Rivera | B24B 37/042 451/287 |
| 8,628,376 | B2 * | 1/2014 | Sin | H01L 22/12 451/41 |
| 8,749,230 | B1 * | 6/2014 | Fogarty | G01B 7/10 324/229 |
| 8,795,029 | B2 * | 8/2014 | Birang | B24B 47/12 451/6 |
| 9,355,442 | B2 * | 5/2016 | Iwanaga | G06T 7/0004 |
| 9,719,869 | B2 * | 8/2017 | Tanaka | B08B 1/34 |
| 10,088,305 | B2 * | 10/2018 | Beselt | G01B 21/24 |
| 10,234,274 | B2 * | 3/2019 | Fuellmeier | G01B 21/042 |
| 10,876,830 | B2 * | 12/2020 | Hughes | G01B 11/0691 |
| 11,168,977 | B2 * | 11/2021 | Kimura | G01B 11/0625 |
| 11,239,097 | B2 * | 2/2022 | Eto | H01L 22/12 |
| 11,486,695 | B2 * | 11/2022 | Chen | B24B 49/12 |
| 11,654,525 | B2 * | 5/2023 | Genozono | B24B 37/30 451/11 |
| 11,740,356 | B2 * | 8/2023 | Hughes | G01B 21/08 356/623 |
| 11,835,418 | B2 * | 12/2023 | Garden | G01M 11/025 |
| 12,290,898 | B2 * | 5/2025 | Fukunaga | H01L 21/67219 |
| 2010/0224127 | A1 * | 9/2010 | Ling | C23C 14/547 118/665 |
| 2014/0355009 | A1 * | 12/2014 | Lin | G01B 11/06 356/630 |
| 2016/0172221 | A1 * | 6/2016 | Takahashi | H01L 21/67219 451/5 |
| 2021/0254963 | A1 * | 8/2021 | Mate | G01B 11/06 |
| 2024/0165766 | A1 * | 5/2024 | Hattori | B24B 7/228 |

FOREIGN PATENT DOCUMENTS

| | | |
|---|---|---|
| JP | 2003-031644 A | 1/2003 |
| JP | 2003-075124 A | 3/2003 |
| JP | 2009-139092 A | 6/2009 |
| JP | 2014-172131 A | 9/2014 |
| JP | 2015-116637 A | 6/2015 |
| JP | 2018-012166 A | 1/2018 |
| JP | 2020-134587 A | 8/2020 |
| WO | 2019198513 A1 | 10/2019 |

* cited by examiner

THICKNESS MEASURING DEVICE AND THICKNESS MEASURING METHOD TO MEASURE THICKNESS OF SUBSTRATE

CROSS-REFERENCE TO RELATED APPLICATIONS

This Application is a U.S. national phase application under 35 U.S.C. § 371 of PCT Application No. PCT/JP2021/031465 filed on Aug. 27, 2021, which claims the benefit of Japanese Patent Application Nos. 2020-152049 and 2020-196984 filed on Sep. 10, 2020 and Nov. 27, 2020, respectively, the entire disclosures of which are incorporated herein by reference.

TECHNICAL FIELD

The various aspects and embodiments described herein pertain generally to a thickness measuring device and a thickness measuring method.

BACKGROUND

Patent Document 1 describes a grinding apparatus equipped with a holding device capable of holding and rotating a plate-shaped workpiece, a grinding device configured to ground the plate-shaped workpiece held by the holding device, and a thickness measuring device configured to measure a thickness of the plate-shaped workpiece held by the holding device. The thickness measuring device measures the thickness of the plate-shaped workpiece from above the workpiece at at least three points including a first measurement point at a midpoint of a radius of the plate-shaped workpiece, and a second measurement point and a third measurement point distanced apart by an equal distance from the first measurement point toward a center and an edge of the workpiece.

PRIOR ART DOCUMENT

Patent Document 1: Japanese Patent Laid-open Publication No. 2014-172131

DISCLOSURE OF THE INVENTION

Means for Solving the Problems

In an exemplary embodiment, a thickness measuring device configured to measure a thickness of a substrate includes a substrate holder configured to hold the substrate; a measurer configured to measure the thickness of the substrate held by the substrate holder; and a moving mechanism configured to move the substrate holder and the measurer relatively in a horizontal direction. The substrate holder is provided with a notch portion which extends in a diametrical direction from a center of the substrate holder to an outer end thereof, and the measurer is configured to be relatively advanced into or retreated from the notch portion.

DETAILED DESCRIPTION

Figure 1:
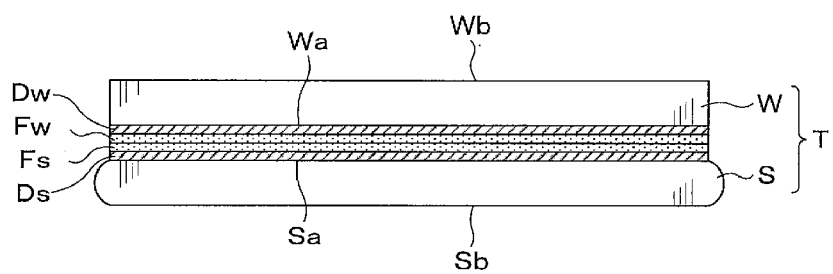
FIG. 1 is a side view illustrating a configuration example of a combined wafer to be processed in a wafer processing system.

In recent years, in a manufacturing process for a semiconductor device, a combined wafer, which is composed of a semiconductor substrate (hereinafter, referred to as "upper wafer") having devices such as a plurality of electronic circuits formed on a surface thereof and a lower wafer bonded to each other, is thinned by grinding a rear surface of the upper wafer.

The thinning of the upper wafer is performed by bringing a grinding whetstone into contact with the rear surface of the upper wafer and grinding the upper wafer while holding a rear surface of the lower wafer by a chuck. However, when performing the grinding of the upper wafer in this way, there is a risk that the flatness (TTV: Total Thickness Variation) of the upper wafer after being ground may deteriorate due to a relative inclination between the grinding whetstone in contact with the rear surface of the upper wafer and the chuck holding the lower wafer.

In the grinding apparatus disclosed in the aforementioned Patent Document 1, the thickness of the plate-shaped workpiece (wafer) is measured at three points by the thickness measuring device, and it is attempted to grind the wafer to a uniform thickness by adjusting an inclination of a rotational axis of a wafer holding surface of the holding device based on the thickness measurement result at the three points. The thickness measuring device is equipped with a measurer configured to measure the thickness of the wafer at multiple points from above the wafer held by the holding device. The measurer radiates measurement light toward the wafer, and measures the thickness of the wafer based on a difference in timings when reflected lights from top and bottom interfaces (top surface and bottom surface) of the wafer are received.

Here, when grinding the upper wafer of the combined wafer, a thickness of a portion of the combined wafer other than the upper wafer (hereinafter referred to as "thickness of the lower wafer" for simplicity) may be calculated by measuring a total thickness of the combined wafer and a thickness of the upper wafer before being ground. By calculating the thickness of the lower wafer in this way, the relative inclination between the grinding whetstone and the chuck is adjusted to uniformly grind the upper wafer.

However, in the grinding apparats described in Patent Document 1, when performing a processing on, for example, the combined wafer, only the thickness of the upper wafer on the grinding side (upper side) can be measured. For this reason, the above-described measurement of the total thickness of the combined wafer is not possible, so the thickness of the lower wafer cannot be calculated. In view of this, there is still a room for improvement in the conventional wafer processing.

The present disclosure provides a technique of measuring a thickness of a substrate appropriately at multiple points in a diametrical direction. Hereinafter, a wafer processing system and a wafer processing method according to an exemplary embodiment will be described with reference to the accompanying drawings. Further, in the present specification and drawings, parts having substantially the same functions and configurations will be assigned same reference numerals, and redundant description thereof will be omitted.

In a wafer processing system 1 to be described below according to the present exemplary embodiment, a processing is performed on a combined wafer T in which an upper wafer W as a first substrate and a lower wafer S as a second substrate are bonded to each other, as described in FIG. 1. Further, in the wafer processing system 1, the upper wafer W is thinned. Hereinafter, in the upper wafer W, a surface to be bonded to the lower wafer S will be referred to as a front surface Wa, and a surface opposite to the front surface Wa will be referred to as a rear surface Wb. Likewise, in the lower wafer S, a surface to be bonded to the upper wafer W will be referred to as a front surface Sa, and a surface opposite to the front surface Sa will be referred to as a rear surface Sb.

The upper wafer W is, for example, a semiconductor wafer such as a silicon substrate, and a device layer Dw including a plurality of devices is formed on the surface Wa. In addition, a surface film Fw is further formed on the device layer Dw, and the device layer Dw is bonded to the lower wafer S with this surface film Fw therebetween. The surface film Fw may be an oxide film (a $SiO_2$ film or a TEOS film), a SiC film, a SiCN film, an adhesive, or the like.

The lower wafer S has the same configuration as the upper wafer W, for example, and a device layer Ds and a surface film Fs are formed on the surface Sa. Further, the lower wafer S does not have to be a device wafer on which the device layer Ds is formed, and it may be, for example, a support wafer supporting the upper wafer W. In this case, the lower wafer S functions as a protection member capable of protecting the device layer Dw of the upper wafer W.

In the drawings to be referred to in the following description, illustration of the device layers Dw and Ds and the surface films Fw and Fs may sometimes be omitted in order to avoid complexity in illustration.

Figure 2:
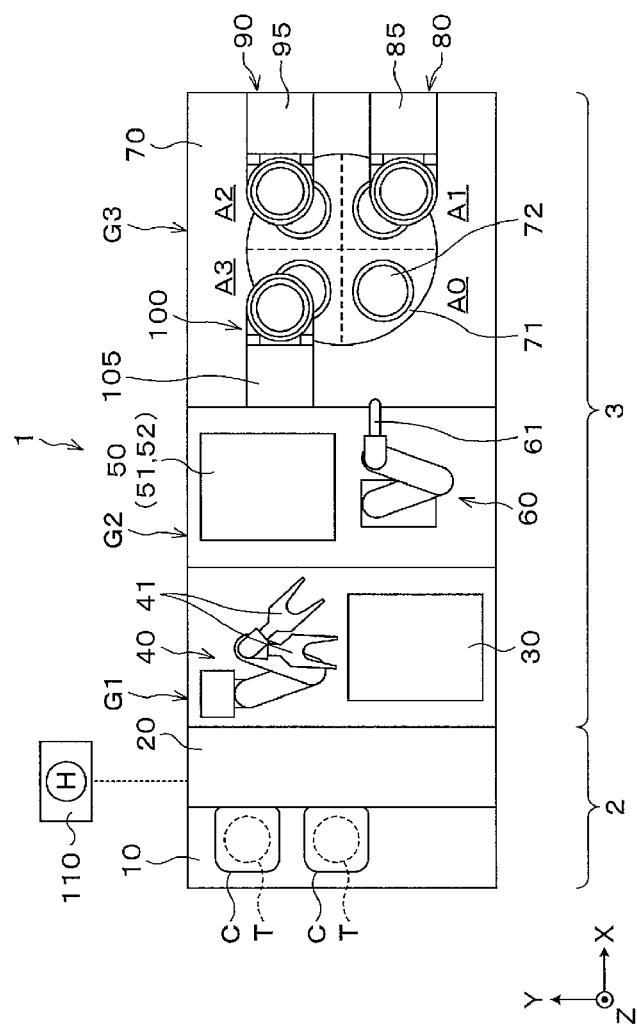
FIG. 2 is a plan view illustrating a configuration of the wafer processing system.
Figure 3:
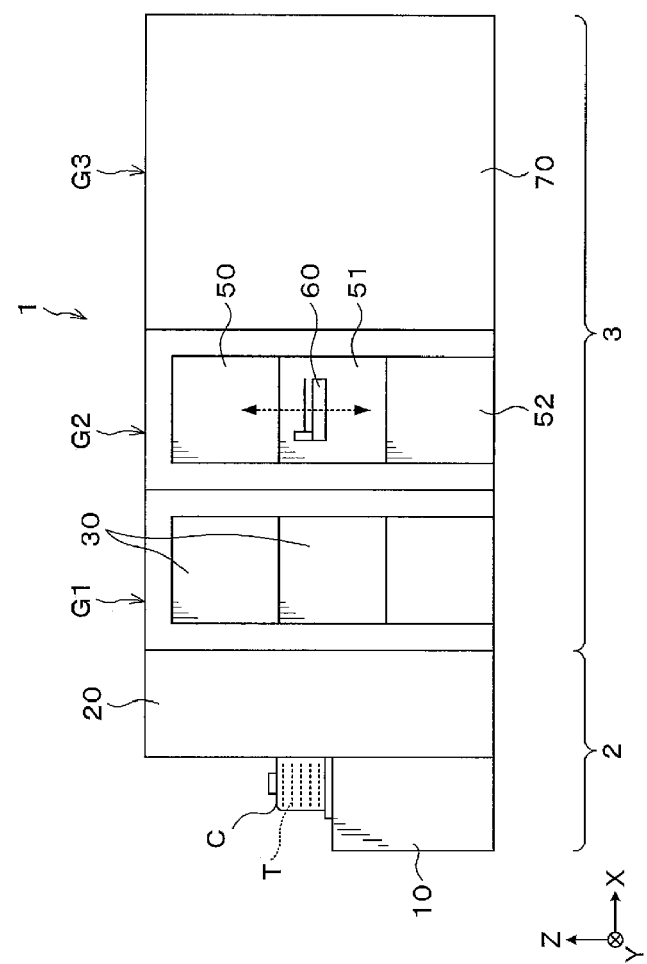
FIG. 3 is a side view illustrating an internal configuration of the wafer processing system.

As shown in FIG. 2 and FIG. 3, the wafer processing system 1 has a configuration in which a carry-in/out station 2 and a processing station 3 are connected as one body. In the carry-in/out station 2, a cassette C capable of accommodating therein a plurality of combined wafers T is carried to/from the outside. The processing station 3 is equipped with various kinds of processing apparatuses configured to perform required processings on the combined wafers T.

A cassette placing table 10 is provided in the carry-in/out station 2. In the shown example, a plurality of, for example, two cassettes C can be arranged on the cassette placing table 10 in a row in the Y-axis direction. Further, the number of the cassettes C placed on the cassette placing table 10 is not limited to the example of the present embodiment but can be selected as required.

In the carry-in/out station 2, a wafer transfer region 20 is provided adjacent to the cassette placing table 10 on the positive X-axis side of the cassette placing table 10.

The processing station 3 is provided with, for example, three processing blocks G1 to G3. The first processing block G1, the second processing block G2, and the third processing block G3 are arranged in this order from the negative X-axis side (carry-in/out station 2 side) toward the positive X-axis side. The respective processing blocks G1 to G3 are spatially blocked from each other by partition walls, and the combined wafer T is transferred between the respective processing blocks G1 to G3 through carry-in/out openings formed at various kinds of processing apparatuses. Further, shutters (not shown) are provided at the carry-in/out openings of the various kinds of processing apparatus to open or close the carry-in/out openings.

In the first processing block G1, etching apparatuses 30 and a wafer transfer device 40 are provided. For example, the etching apparatuses 30 are stacked in two levels in a vertical direction. The wafer transfer device 40 is disposed on the positive Y-axis side of the etching apparatus 30. Here, the number and the layout of the etching apparatuses 30 and the wafer transfer device 40 are not limited to the shown example.

The etching apparatus 30 is configured to etch the rear surface Wb of the upper wafer W and the rear surface Sb of the lower wafer S after being ground. At this time, a cleaning processing such as particle removal and metal component removal are also performed. For example, an etching liquid (chemical liquid) is supplied to the rear surfaces Wb and Sb to wet-etch them. As an example of the etching liquid, HF, $HNO_3$, $H_3PO_4$, TMAH, Choline, KOH, or the like may be used.

The wafer transfer device 40 has, for example, two transfer arms 41 each of which is configured to hold and transfer the combined wafer T. Each transfer arm 41 is configured to be movable in a horizontal direction and a vertical direction and rotatable around a horizontal axis and a vertical axis. The wafer transfer device 40 is configured to transfer the combined wafer T to/from the cassette C of the cassette placing table 10, the etching apparatus 30, a first cleaning apparatus 50 to be described later, a second cleaning apparatus 51 to be described later, and an alignment apparatus 52 to be described later.

In addition, a non-illustrated fan filter unit (FFU) is provided in the first processing block G1. Thus, cleanliness of the inside of the first processing block G1 is maintained high, and an internal pressure of the first processing block G1 is maintained higher than that of the second processing block G2.

In the second processing block G2, the first cleaning apparatus 50, the second cleaning apparatus 51, the alignment apparatus 52, and a wafer transfer device 60 are provided. The first cleaning apparatus 50, the second cleaning apparatus 51, and the alignment apparatus 52 are stacked in this order from above. The wafer transfer device 60 is disposed on the negative Y-axis side of the first cleaning apparatus 50, the second cleaning apparatus 51, and the alignment apparatus 52. Here, the number and the layout of the first cleaning apparatus 50, the second cleaning apparatus 51, the alignment apparatus 52, and the wafer transfer device 60 are not limited to the shown example.

The first cleaning apparatus 50 is configured to clean the rear surface Wb of the upper wafer W and the rear surface Sb of the lower wafer S after being ground in a processing apparatus 70 to be described later. For example, by supplying a cleaning liquid to the rear surface Wb, the rear surface Wb is spin-cleaned, and by bringing a brush into contact with the rear surface Sb, the rear surface Sb is scrub-cleaned. Further, in the first cleaning apparatus 50, the thickness of the upper wafer W in the combined wafer T is measured. A detailed configuration of the first cleaning apparatus 50 will be described later.

The second cleaning apparatus 51 is configured to clean the rear surface Wb of the upper wafer W and the rear surface Sb of the lower wafer S before being ground in the processing apparatus 70 to be described later. For example, like the first cleaning apparatus 50, the second cleaning apparatus 51 spin-cleans the rear surface Wb by supplying a cleaning liquid to the rear surface Wb, and scrub-cleans the rear surface Sb by bringing a brush into contact with the rear surface Sb. Further, in the second cleaning apparatus 51, the thickness of the upper wafer W in the combined wafer T is measured. In addition, in case of measuring the thickness of the upper wafer W by the alignment apparatus 52, the function of measuring the thickness of the upper wafer W in the second cleaning apparatus 51 may be omitted. A detailed configuration of the second cleaning apparatus 51 will be described later.

In the present exemplary embodiment, although the first cleaning apparatus 50 for processing the combined wafer T after being ground and the second cleaning apparatus 51 for processing the combined wafer T before being ground are distinguished, the configurations of the first cleaning apparatus 50 and the second cleaning apparatus 51 are substantially the same. Therefore, in both the first cleaning apparatus 50 and the second cleaning apparatus 51, the processing of either the combined wafer T after being ground or before being ground may be performed.

The alignment apparatus 52 is configured to adjust a direction and a position of the combined wafer T in a horizontal direction before being ground in the processing apparatus 70 to be described later. Further, the alignment apparatus 52 measures the total thickness of the combined wafer T before being ground, and functions as a "thickness measuring device" in the present disclosure. A detailed configuration of the alignment apparatus 52 will be discussed later.

The wafer transfer device 60 has, for example, two transfer arms 61 each of which is configured to attract and hold the combined wafer T with an attracting/holding surface (not shown). Each transfer arm 61 is configured to be movable in a horizontal direction and a vertical direction and pivotable around a horizontal axis and a vertical axis. The wafer transfer device 60 is configured transfer the combined wafer T to/from the first cleaning apparatus 50, the second cleaning apparatus 51, the alignment apparatus 52, and the processing apparatus 70 to be described later.

The single processing apparatus 70 is provided in the third processing block G3. Here, however, the number and the layout of processing apparatus 70 is not limited to the shown example.

The processing apparatus 70 has a rotary table 71. Provided on the rotary table 71 are four chucks 72 each of which serves as a substrate holder configured to attract and hold the combined wafer T. By way of example, a porous chuck is used as the chuck 72, and it attracts and holds the rear surface Sb of the lower wafer S of the combined wafer T. A surface of the chuck 72, that is, a holding surface for holding the combined wafer T has a protruding shape with a central portion thereof protruding higher than an end portion thereof when viewed from the side. In addition, since the protrusion of this central portion is minute, illustration of the protruding shape of the chuck 72 is omitted in the following description.

Figure 4:
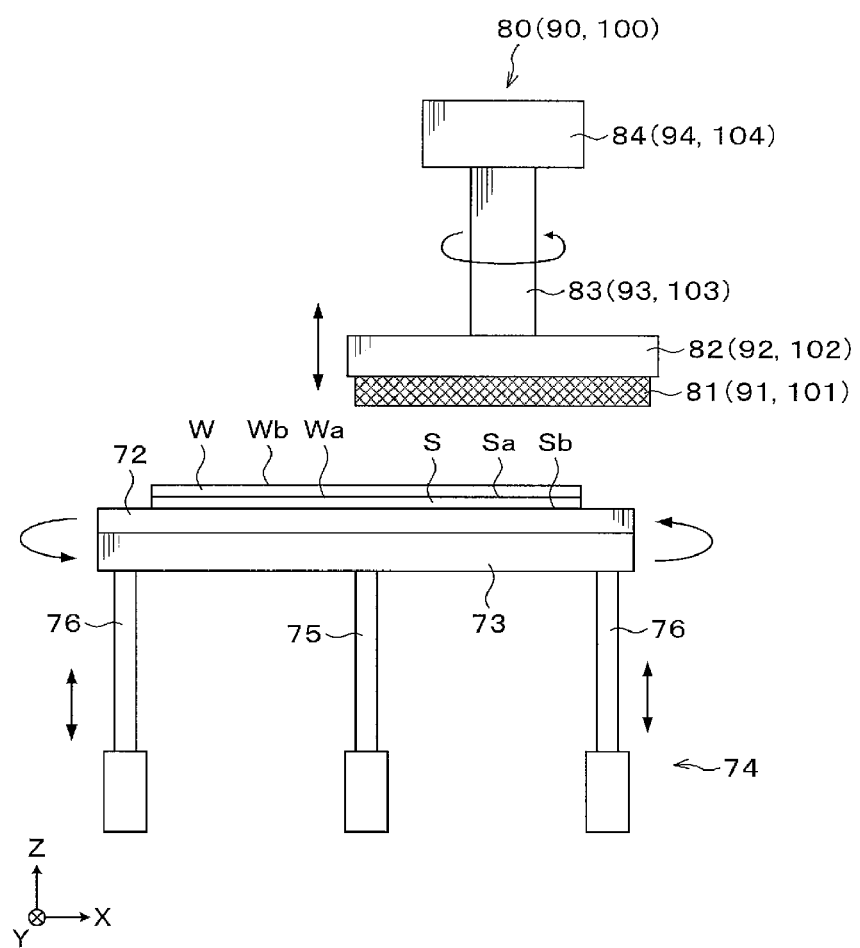
FIG. 4 is a side view illustrating an example configuration of a grinding unit.

As depicted in FIG. 4, the chuck 72 is held by a chuck base 73. The chuck base 73 is provided with an inclination adjuster 74 configured to adjust a relative inclination of the chuck 72 with respect to a grinding wheel of each grinding unit (a rough grinding unit 80, an intermediate grinding unit 90, and a finishing grinding unit 100) to be described later. The inclination adjuster 74 has a fixed shaft 75 and a plurality of, e.g., two elevating shafts 76 provided on a bottom surface of the chuck base 73. Each elevating shaft 76 is configured to be extensible/contractible, and serves to move the chuck base 73 up and down. With this inclination adjuster 74, by raising and lowering one end of an outer periphery of the chuck base 73 in a vertical direction by the elevating shaft 76 with respect to the other end thereof (the position corresponding to the fixed shaft 75), the chuck 72 and the chuck base 73 can be tilted. Thus, it is possible to adjust the relative inclination between a surface of the chuck 72 and surfaces of the grinding wheels belonging to the respective grinding units 80, 90 and 100 at processing positions A1 to A3.

Further, the configuration of the inclination adjuster 74 is not limited to the above-described example, and any of various other configurations may be selected as long as the relative angle (parallelism) of the surface of the chuck 72 with respect to the surface of the grinding wheel can be adjusted.

As depicted in FIG. 2, the four chucks 72 can be moved to a delivery position A0 and the processing positions A1 to A3 as the rotary table 71 is rotated. In addition, each of the four chucks 72 is configured to be rotatable around a vertical axis by a rotating mechanism (not shown).

At the delivery position A0, a delivery of the combined wafer T is performed by the wafer transfer device 60. A rough grinding unit 80 is disposed at the processing position A1 to roughly grind the upper wafer W. An intermediate grinding unit 90 is disposed at the processing position A2 to grind the upper wafer W to an intermediate level. The finishing grinding unit 100 is disposed at the processing position A3 to finely grind the upper wafer W.

As shown in FIG. 4, the rough grinding unit 80 includes a rough grinding wheel 81 having an annular rough grinding whetstone on a bottom surface thereof; a mount 82 supporting the rough grinding wheel 81; a spindle 83 configured to rotate the rough grinding wheel 81 via the mount 82; and a driving unit 84 having, for example, a motor (not shown) embedded therein. Moreover, the rough grinding unit 80 is configured to be movable in a vertical direction along a supporting column 85 shown in FIG. 2.

The intermediate grinding unit 90 has the same configuration as the rough grinding unit 80. That is, the intermediate grinding unit 90 has an intermediate grinding wheel 91 equipped with an annular intermediate grinding whetstone; a mount 92; a spindle 93; a driving unit 94; and a supporting column 95. A particle size of abrasive grains of the intermediate grinding whetstone is smaller than that of the rough grinding whetstone.

The finishing grinding unit 100 has the same configuration as the rough grinding unit 80 and the intermediate grinding unit 90. That is, the finishing grinding unit 100 has a finishing grinding wheel 101 provided with an annular finishing grinding whetstone as a grinder; a mount 102; a spindle 103; a driving unit 104; and a supporting column 105. A particle size of abrasive grains of the finishing grinding whetstone is smaller than that of the intermediate grinding whetstone.

In addition, a non-illustrated exhaust unit is provided in the third processing block G3. With this configuration, particles or the like generated by a grinding processing in the processing apparatus 70 are discharged out, and an internal pressure of the third processing block G3 is kept lower than an internal pressure of the second processing block G2. That is, in the wafer processing system 1, the internal pressures of the first processing block G1, the second processing block G2, and the third processing block G3 are controlled to be higher in this order so that the particles or the like generated by the grinding processing in the processing apparatus 70 are not flown out to the first processing block G1. In other words, adhesion of the particles or the like to the combined wafer T after being subjected to a series of processings in the wafer processing system 1 is suppressed.

As illustrated in FIG. 2, the above wafer processing system 1 is equipped with a control device 110 as a controller. The control device 110 is, for example, a computer equipped with a CPU, a memory, and so forth, and has a program storage (not shown). The program storage stores therein a program for controlling a wafer processing in the wafer processing system 1. Further, the program may have been recorded on a computer-readable recording medium H, and may be installed from the recording medium H to the control device 110.

Now, the first cleaning apparatus 50 and the second cleaning apparatus 51 described above will be elaborated. In the present exemplary embodiment, although the first cleaning apparatus 50 configured to process the combined wafer T after being ground and the second cleaning apparatus 51 configured to process the combined wafer T before being ground are distinguished, the configurations of the first cleaning apparatus 50 and the second cleaning apparatus 51 are substantially the same. Therefore, in the following description, only the first cleaning apparatus 50 will be explained, while omitting the explanation of the second cleaning apparatus 51.

Figure 5:
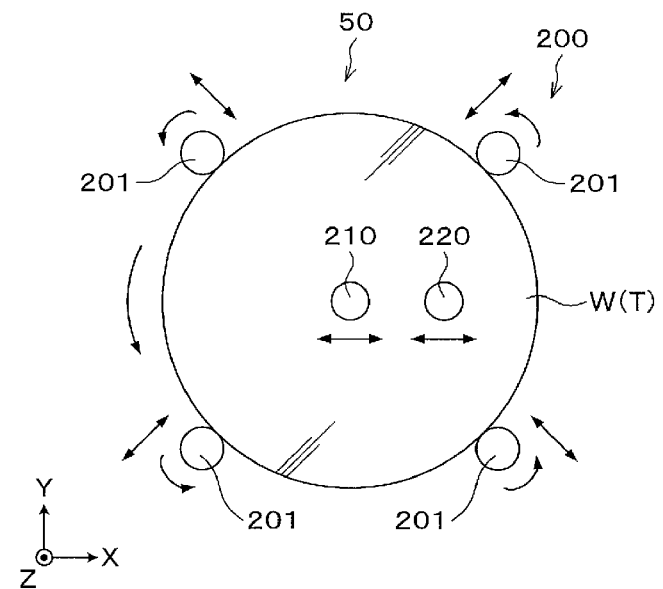
FIG. 5 is a plan view illustrating a configuration of a first cleaning apparatus.
Figure 6:
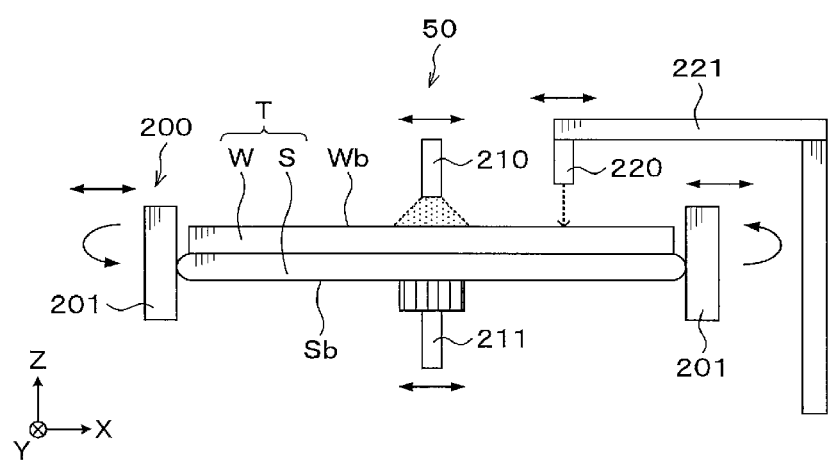
FIG. 6 is a side view illustrating the configuration of the first cleaning apparatus.

As illustrated in FIG. 5 and FIG. 6, the first cleaning apparatus 50 has a holding mechanism 200 configured to hold the combined wafer T in the state that the upper wafer W is placed on the upper side and the lower wafer S is placed on the lower side. The holding mechanism 200 has a plurality of, for example, four holding rollers 201 configured to hold an outer side surface of the combined wafer T. The holding rollers 201 are equi-spaced in a circumferential direction of the combined wafer T.

The holding rollers 201 come into contact with the outer side surface of the combined wafer T, and hold the combined wafer T by frictional forces. Further, the method of holding the combined wafer T by the holding rollers 201 is not limited to this example. By way of example, the combined wafer T may be held by being inserted into a recess portion formed on a side surface of each of the holding rollers 201. In addition, the holding method for the outer side surface of the combined wafer T is not limited to the method using the holding rollers 201. For example, the outer side surface of the combined wafer T may be fixed and held by a fixing/holding member (not shown), and the fixing/holding member and the combined wafer T may be rotated as a whole. Alternatively, when cleaning only the rear surface Wb of the upper wafer W, for example, the rear surface Sb of the lower wafer S may be attracted and held by an attracting/holding member (not shown).

The holding roller 201 is configured to be rotatable about a vertical axis as a rotational axis. The holding roller 201 is provided with a drive mechanism (not shown) configured to rotate the holding roller 201. Further, the drive mechanism may be configured to rotate one holding roller 201 or configured to rotate the plurality of holding rollers 201. As the at least one holding roller 201 is rotated by the drive mechanism, the combined wafer T is rotated around the vertical axis. Further, each holding roller 201 is configured to be movable in a horizontal direction by a moving mechanism (not shown).

A cleaning liquid nozzle 210 is provided above the combined wafer T held by the holding mechanism 200. The cleaning liquid nozzle 210 cleans, more specifically, spin-cleans the rear surface Wb of the upper wafer W. For example, while rotating the combined wafer T by the holding mechanism 200, a cleaning liquid, for example, pure water is supplied from the cleaning liquid nozzle 210 onto the rear surface Wb of the upper wafer W. Then, the supplied cleaning liquid spreads on the rear surface Wb, and the rear surface Wb is cleaned. Further, the cleaning liquid nozzle 210 is configured to be movable in the horizontal direction above the combined wafer T by a moving mechanism (not shown).

Provided below the combined wafer T held by the holding mechanism 200 is a cleaning brush 211. The cleaning brush 211 cleans, more specifically, scrub-cleans the rear surface Sb of the lower wafer S. For example, while the cleaning brush 211 is kept in contact with the rear surface Sb of the lower wafer S, a cleaning liquid such as pure water is discharged from a cleaning liquid nozzle (not shown) to clean the rear surface Sb.

In this way, the first cleaning apparatus 50 is configured to clean the rear surface Wb of the upper wafer W and the rear surface Sb of the lower wafer S at the same time in the state that the combined wafer T is held by the holding mechanism 200.

Figure 7:
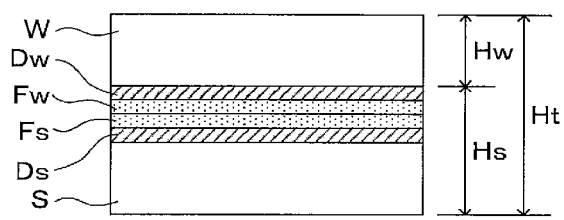
FIG. 7 is an explanatory diagram illustrating a thickness of an upper wafer, a thickness of a lower wafer, and a total thickness of a combined wafer.

Above the combined wafer T held by the holding mechanism 200, a partial thickness measurer 220 is provided. The partial thickness measurer 220 is configured to measure a thickness Hw of the upper wafer W shown in FIG. 7. The partial thickness measurer 220 has a partial thickness sensor configured to measure the thickness of the upper wafer W without coming into contact with the upper wafer W. The partial thickness sensor radiates light to the upper wafer W, and receives reflection light reflected from the front surface Wa of the upper wafer W and reflection light reflected from the rear surface Wb of the upper wafer W. Then, in the partial thickness measurer 220, the thickness Hw of the upper wafer W is measured based on both of the reflection lights.

In addition, the partial thickness measurer 220 is configured to be movable in a horizontal direction above the combined wafer T by a moving mechanism 221. Accordingly, the partial thickness measurer 220 is capable of measuring the thickness Hw of the upper wafer W at multiple points.

Figure 8:
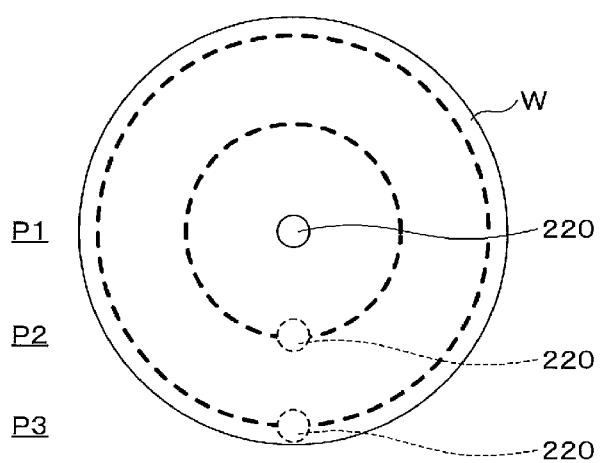
FIG. 8 is an explanatory diagram illustrating a state in which the thickness of the upper wafer is being measured.

In the present exemplary embodiment, as shown in FIG. 8, the partial thickness measurer 220 measures the thickness Hw of the upper wafer W at, for example, three points in the diametrical direction. A measurement point P1 is a center of the upper wafer W. A measurement point P2 is a middle portion of the upper wafer W and is a position corresponding to R/2 from the center of the upper wafer W when a radius of the upper wafer W is defined as R. A measurement point P3 is an outer periphery of the upper wafer W.

At the measurement point P1, the thickness Hw of the upper wafer W is measured by the partial thickness measurer 220 in the state that the rotation of the combined wafer T is stopped. At this time, the thickness Hw of the upper wafer W may be measured while rotating the combined wafer T.

At the measurement point P2, while rotating the combined wafer T, the thickness Hw of the upper wafer W is measured by the partial thickness measurer 220 at multiple points in the circumferential direction. Then, at the measurement point P2, a moving average value of the thicknesses measured at the multiple points in the circumferential direction is calculated, and this moving average value is taken as the thickness Hw of the upper wafer W. Further, a moving median value of the thicknesses measured at the multiple points in the circumferential direction may be calculated as the thickness Hw of the upper wafer W at the measurement point P2. Also, at the measurement point P3, the thickness Hw of the upper wafer W is measured in the same manner as measured at the measurement point P2.

In the present exemplary embodiment, at the measurement points P2 and P3, the moving average value or the moving median value of the multiple points in the circumferential direction is set as the thickness Hw of the upper wafer W. However, the thickness Hw of the upper wafer W on designated coordinates may be measured instead. For example, at the measurement points P2 and P3, the thickness Hw of the upper wafer W is measured in the state that the rotation of the combined wafer T is stopped. As a result, at the measurement points P2 and P3, the thickness Hw of the upper wafer W at one point in the circumferential direction is measured.

Further, in the present exemplary embodiment, the measurement result of the thickness Hw of the upper wafer W is used to adjust the parallelism between the surface of the chuck 72 and the surface of the finishing grinding wheel 101, as will be described later. However, the usage of this measurement result is not limited thereto. For example, in order to investigate a tendency of the thickness Hw of the upper wafer W, the thickness Hw of the upper wafer W may be measured at a designated measurement point.

Figure 9:
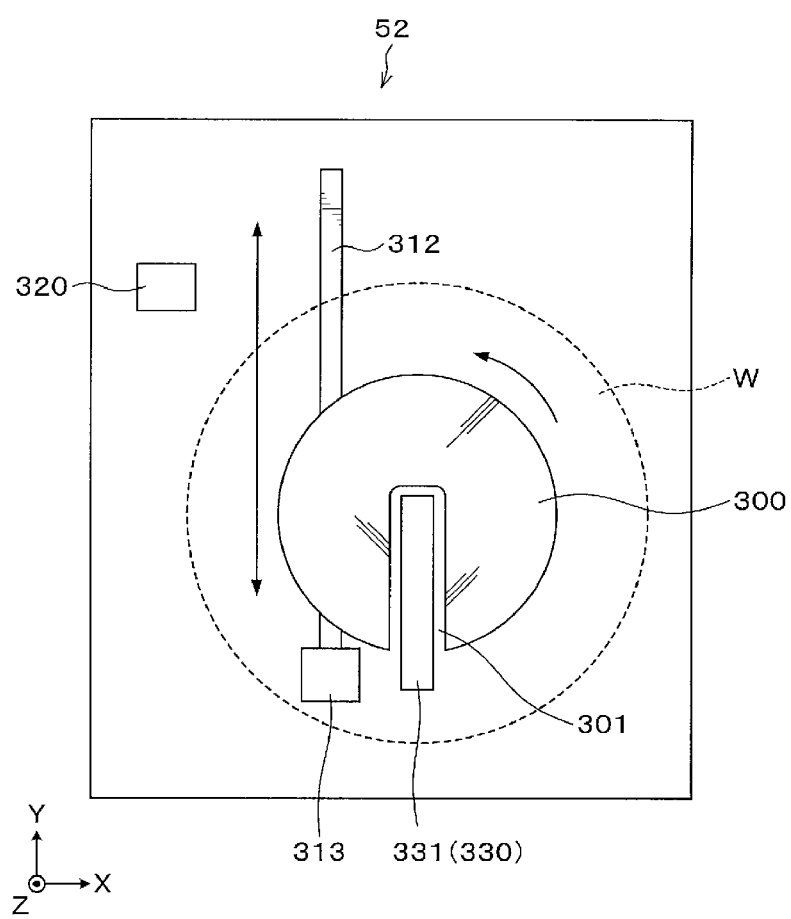
FIG. 9 is a plan view illustrating a configuration of an alignment apparatus.
Figure 10:
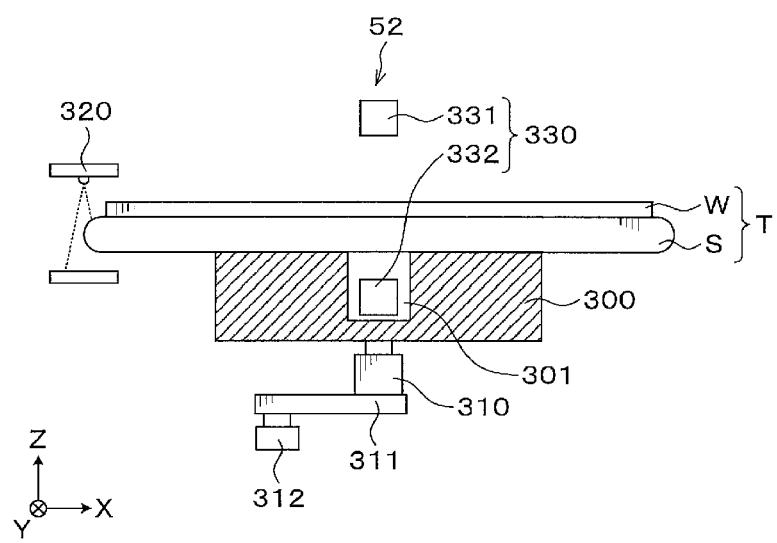
FIG. 10 is a side view illustrating the configuration of the alignment apparatus.

Now, the aforementioned alignment apparatus 52 will be described. As shown in FIG. 9 and FIG. 10, the alignment apparatus 52 has a chuck 300 as a substrate holder configured to hold the combined wafer T. The chuck 300 is configured to attract and hold a central portion of the rear surface Sb of the lower wafer S of the combined wafer T. Here, the chuck 300 has a diameter equal to or less than, for example, a half of the diameter of the combined wafer T.

A notch portion 301 extending in the diametrical direction (Y-axis direction) from the center of the chuck 300 to an outer end thereof is formed at the chuck 300. The notch portion 301 is formed so that a lower sensor 332 of a total thickness measurer 330 to be described later can advance thereinto and retreat therefrom.

The chuck 300 is configured to be rotatable about a vertical axis and, also, to be movable in a horizontal direction. Below the chuck 300, there is provided a rotating mechanism 310 configured to rotate the chuck 300. A driving unit (not shown) such as, but not limited to, a motor is incorporated in the rotating mechanism 310. The rotating mechanism 310 is supported by a supporting member 311. The supporting member 311 is mounted to a rail 312 extending in a horizontal direction (Y-axis direction). The supporting member 311 is configured to be movable along the rail 312 by a moving mechanism 313 provided at the rail 312. A driving unit (not shown) such as, but not limited to, a motor is incorporated in the moving mechanism 313.

A detector 320 is provided on a lateral side (negative X-axis side) of the chuck 300. The detector 320 is configured to adjust a direction and a position of the combined wafer T before being ground in a horizontal direction. The detector 320 has a sensor that is configured to radiate light to the outer periphery of the upper wafer W held on the chuck 300 and receive the light. Alternatively, the detector 320 may have a sensor configured to image the outer periphery of the upper wafer W. While rotating the combined wafer T held in the chuck 300, the detector 320 detects a position of a notch portion of the upper wafer W, and also detects the position of the center of the upper wafer W. Based on these detection results, the direction of the combined wafer T in the horizontal direction is adjusted (θ alignment), and the position of the combined wafer T in the horizontal direction is adjusted (X-Y alignment).

Above and below the chuck 300, there is provided the total thickness measurer 330. The total thickness measurer 330 measures a total thickness Ht of the combined wafer T shown in FIG. 7. The total thickness Ht of the combined wafer T measured by the total thickness measurer 330 and the thickness Hw of the upper wafer W measured by the partial thickness measurer 220 are both outputted to the control device 110. In the control device 110, a thickness Hs of the portion of the combined wafer T other than the upper wafer W is calculated by subtracting the thickness Hw of the upper wafer W from the total thickness Ht of the combined wafer T. This thickness Hs includes a thickness of the lower wafer S, thicknesses of the device layers Dw and Ds, and thicknesses of the surface films Fw and Fs. For the simplicity of explanation, however, the thickness Hs may sometimes be referred to as the thickness Hs of the lower wafer S in the following description.

Figure 11:
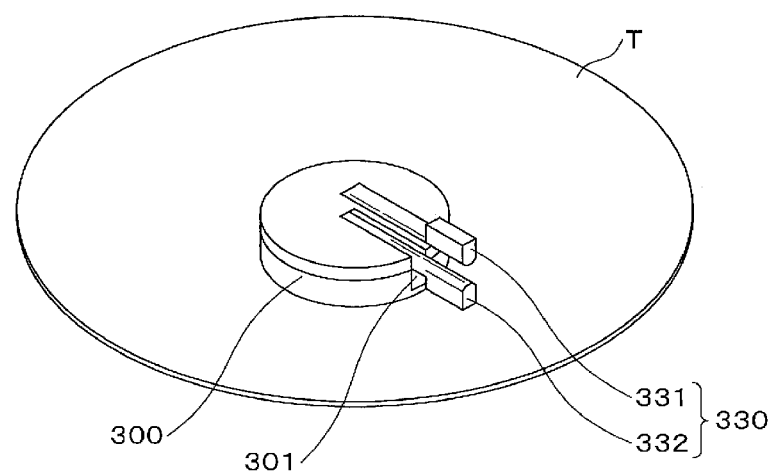
FIG. 11 is a perspective view illustrating a configuration of a total thickness measurer.

As shown in FIG. 9 to FIG. 11, the total thickness measurer 330 has an upper sensor 331 and a lower sensor 332. The upper sensor 331 is disposed above the combined wafer T held by the chuck 300, and measures a distance from the upper sensor 331 to the rear surface Wb of the upper wafer W. The lower sensor 332 is disposed below the combined wafer T held by the chuck 300, and measures a distance from the lower sensor 332 to the rear surface Sb of the lower wafer S. Further, the upper sensor 331 and the lower sensor 332 are disposed to face each other on the same coordinate axis, so that a measurement point of the upper sensor 331 and a measurement point of the lower sensor 332 are overlapped when viewed from the top. Further, the total thickness measurer 330 calculates the total thickness Ht of the combined wafer T based on the distance between the upper sensor 331 and the rear surface Wb of the upper wafer W and the distance between the lower sensor 332 and the rear surface Sb of the lower wafer S.

The upper sensor 331 and the lower sensor 332 are moved relative to the chuck 300 as the chuck 300 is moved in the horizontal direction. Further, the lower sensor 332 is configured to be moved forward and backward relative to the notch portion 301. That is, as the chuck 300 is moved in the horizontal direction, the lower sensor 332 advances into or retreats from the notch portion 301. The total thickness measurer 330 may measure the total thickness Ht of the combined wafer T at multiple points.

Figure 12A:
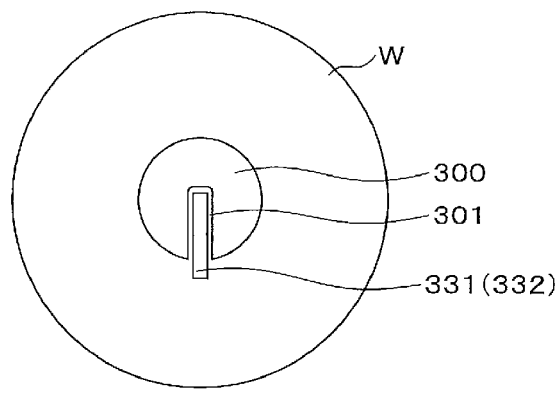
FIG. 12A to FIG. 12C are explanatory diagrams illustrating a state in which the total thickness of the combined wafer is being measured.
Figure 12B:
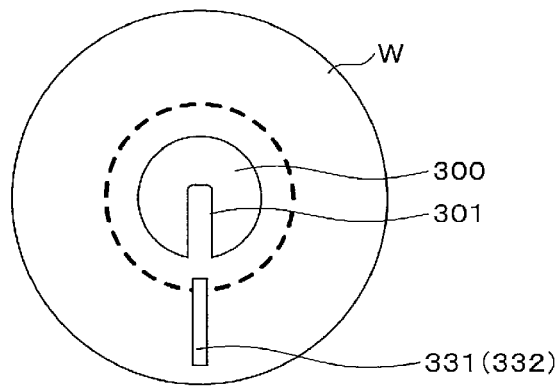
Figure 12C:
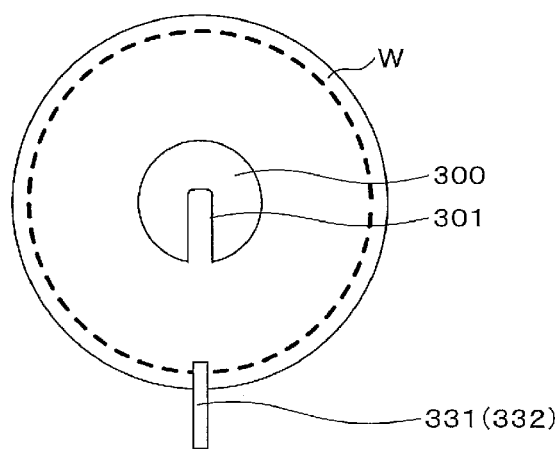

The measurement points of the total thickness Ht of the combined wafer T by the total thickness measurer 330 are the same as the measurement points of the thickness Hw of the upper wafer W by the partial thickness measurer 220. That is, as shown in FIG. 12A to FIG. 12C, the total thickness measurer 330 measures the total thickness Ht of the combined wafer T at the three points in the diametrical direction, for example. The measurement point P1 is the center of the upper wafer W. The measurement point P2 is the middle portion of the upper wafer W, corresponding to R/2 from the center when the radius of the upper wafer W is R. The measurement point P3 is the outer periphery of the upper wafer W.

As illustrated in FIG. 12A, at the measurement point P1, the total thickness measurer 330 measures the total thickness Ht of the combined wafer T in the state that the rotation of the chuck 300 (combined wafer T) is stopped. At this time, the lower sensor 332 is in the notch 301. Therefore, in order to avoid interference between the lower sensor 332 and the chuck 300, the chuck 300 is not rotated.

As shown in FIG. 12B, at the measurement point P2, the total thickness Ht of the combined wafer T is measured at multiple points in the circumferential direction by the total thickness measurer 330, while rotating the chuck 300. At this time, the diameter of the chuck 300 is less than the half of the diameter of the combined wafer T and the lower sensor 332 is retreated from the notch portion 301. Thus, even if the chuck 300 is rotated, the lower sensor 332 and the chuck 300 do not interfere with each other. Then, at the measurement point P2, a moving average value of the thicknesses measured at the multiple points in the circumferential direction is calculated, and the calculated moving average value is taken as the total thickness Ht of the combined wafer T at the measurement point P2. Alternatively, a moving median value of the thicknesses measured at the multiple points in the circumferential direction may be calculated as the total thickness Ht of the combined wafer T at the measurement point P2.

As depicted in FIG. 12C, at the measurement point P3 as well, the total thickness Ht of the combined wafer T is measured in the same way as measured at the measurement point P2.

Further, in the alignment apparatus 52 according to the present exemplary embodiment, the chuck 300 is moved in the horizontal direction (Y-axis direction), and the upper sensor 331 and the lower sensor 332 of the total thickness measurer 330 are fixed. However, the chuck 300 and the total thickness measurer 330 need only to be moved relative to each other in the horizontal direction. For example, the chuck 300 may be fixed, and the upper sensor 331 and the lower sensor 332 may be moved in the horizontal direction. Alternatively, the chuck 300 may be moved in the horizontal direction, and the upper sensor 331 and the lower sensor 332 may also be moved in the horizontal direction.

Now, the wafer processing performed by using the wafer processing system 1 configured as described above will be described. In the present exemplary embodiment, the upper wafer W and the lower wafer S are bonded in a bonding apparatus (not shown) provided outside the wafer processing system 1 to form the combined wafer T in advance.

First, the cassette C accommodating therein the plurality of combined wafers T is placed on the cassette placing table 10 of the carry-in/out station 2. Then, the combined wafer T in the cassette C is taken out by the wafer transfer device 40 and transferred to the second cleaning apparatus 51.

In the second cleaning apparatus 51, the combined wafer T is first held by the holding mechanism 200. Then, the cleaning liquid nozzle 210 is disposed above the center of the combined wafer T, and the cleaning brush 211 is disposed below the center of the combined wafer T. Thereafter, while rotating the combined wafer T, the cleaning liquid is discharged from the cleaning liquid nozzle 210 to the rear surface Wb of the upper wafer W to thereby spin-clean the rear surface Wb. Further, in the state that the cleaning brush 211 is in contact with the rear surface Sb of the lower wafer S, a cleaning liquid is discharged from a cleaning liquid nozzle (not shown) to scrub-clean the rear surface Sb (process E1 of FIG. 13). In the process E1 of the present exemplary embodiment, although both of the rear surfaces Wb and Sb are cleaned, it is only necessary to clean at least the rear surface Sb on the side held by the chuck 72.

Subsequently, the cleaning liquid nozzle 210 is retreated from above the combined wafer T, the cleaning brush 211 is retreated from below the combined wafer T, and the partial thickness measurer 220 is placed above the combined wafer T. Then, as shown in FIG. 8, the partial thickness measurer 220 is moved to the measurement points P1, P2 and P3 in sequence, and the thickness Hw of the upper wafer W is measured at the individual measurement points P1, P2 and P3 by the partial thickness measurer 220 (process E2 of FIG. 13). The measured thickness Hw (distribution of the thickness Hw) of the upper wafer W is outputted to the control device 110.

Thereafter, the combined wafer T is transferred to the alignment apparatus 52 by the wafer transfer device 40. First, in the alignment apparatus 52, the combined wafer T is attracted to and held by the chuck 300 at a carry-in/out position (home position). Subsequently, the chuck 300 is moved toward the detector 320. Then, while rotating the combined wafer T, the detector 320 detects the position of the notch portion of the upper wafer W, and also detects the position of the center of the upper wafer W. Based on these detection results, the direction of the combined wafer T in the horizontal direction is adjusted (θ alignment), and the position of the combined wafer T in the horizontal direction is also adjusted (X-Y alignment) (process E3 of FIG. 13).

Next, the chuck 300 is moved toward the total thickness measurer 330. At this time, as illustrated in FIG. 12A, each of the upper sensor 331 and the lower sensor 332 of the total thickness measurer 330 is located at the measurement point P1. That is, the lower sensor 332 is located within the notch portion 301. Then, in the state that the rotation of the combined wafer T is stopped, the total thickness Ht of the combined wafer T at the measurement point P1 is measured by the total thickness measurer 330.

Afterwards, as shown in FIG. 12B, the chuck 300 is moved in the positive Y-axis direction, and each of the upper sensor 331 and the lower sensor 332 is positioned at the measurement point P2. At this time, the lower sensor 332 is retreated from the notch portion 301. Then, while rotating the chuck 300, the total thickness Ht of the combined wafer T at the measurement point P2 is measured at the multiple points in the circumferential direction by the total thickness measurer 330. Further, the moving average value of the thicknesses measured at the multiple points in the circumferential direction is calculated, and the calculated moving average value is taken as the total thickness Ht of the combined wafer T at the measurement point P2.

Next, as shown in FIG. 12C, the chuck 300 is further moved in the positive Y-axis direction, and the upper sensor 331 and the lower sensor 332 are respectively positioned at the measurement point P3. The total thickness Ht of the combined wafer T at the measurement point P3 is measured, the same as measured at the measurement point P2. In this way, the total thickness Ht of the combined wafer T at each of the measurement points P1, P2 and P3 is measured by the total thickness measurer 330 (process E4 of FIG. 13). The total thickness Ht (distribution of the total thickness Ht) of the combined wafer T measured in this way is outputted to the control device 110.

Upon the completion of the alignment in process E3 and the measurement of the total thickness Ht of the combined wafer T in the process E4 described above, the chuck 300 is moved to the carry-in/out position.

Figure 13:
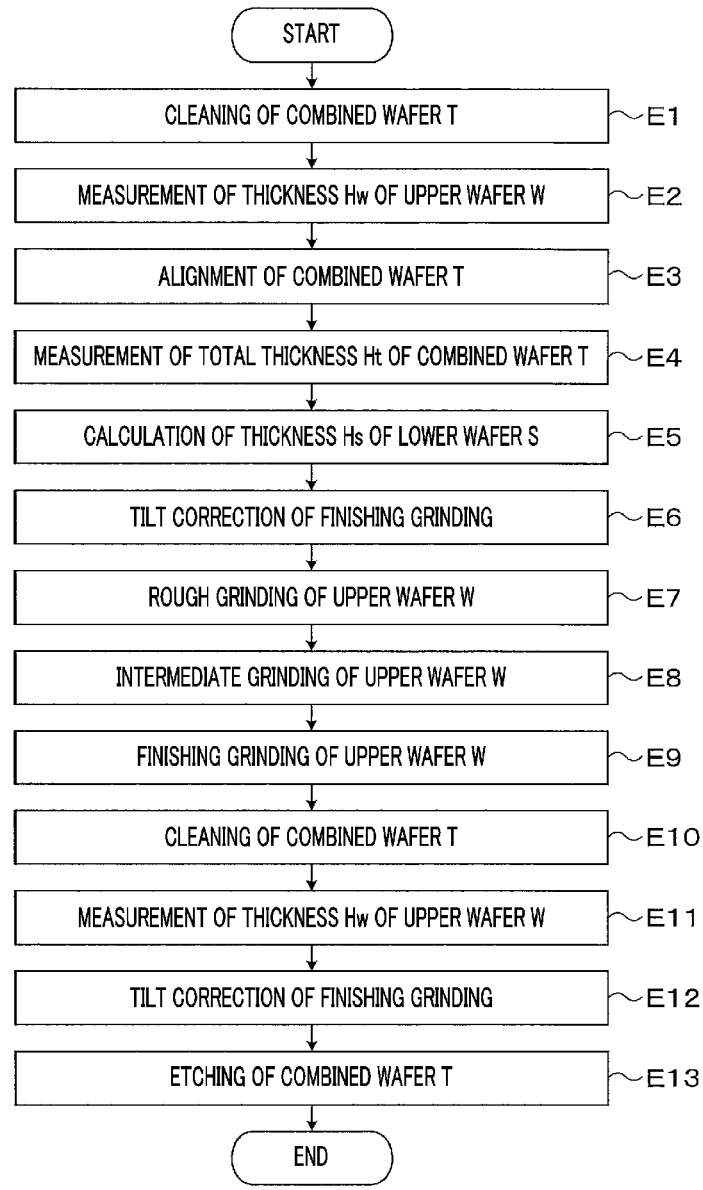
FIG. 13 is a flowchart illustrating main processes of a wafer processing.

The control device 110 calculates the thickness Hs of lower wafer S by subtracting the thickness Hw of the upper wafer W measured in the process E2 from the thickness Ht of the combined wafer T measured in the process E4 (process E5 of FIG. 13). This thickness Hs includes the thickness of the lower wafer S, the thicknesses of the device layers Dw and Ds, and the thicknesses of the surface films Fw and Fs as mentioned above. The thickness Hs of the lower wafer S is calculated at each of the measurement points P1, P2 and P3, and, accordingly, a distribution of the thickness Hs of the lower wafer S is obtained.

Further, based on the distribution of the thickness Hs of the lower wafer S calculated in the process E5, the control device 110 controls the inclination adjuster 74 at the processing position A3 of the processing apparatus 70. Specifically, based on the distribution of the thickness Hs of the lower wafer S, the parallelism between the surface of the chuck 72 and the surface of the finishing grinding wheel 101 is adjusted such that the in-plane thickness of the upper wafer W, which is bonded to the lower wafer S, after being subjected to the finishing grinding becomes uniform (process E6 of FIG. 13). In the following description, the adjustment of the parallelism between the surface of the chuck 72 and the surface of the finishing grinding wheel 101 may be referred to as "tilt correction".

Subsequently, the combined wafer T is transferred to the processing apparatus 70 by the wafer transfer device 60, and transferred to the chuck 72 at the delivery position A0.

Then, the rotary table 71 is rotated to move the combined wafer T to the processing position A1. Then, the rear surface Wb of the upper wafer W is roughly ground by the rough grinding unit 80 (process E7 of FIG. 13). At this time, while measuring the total thickness Ht of the combined wafer T by using a contact type thickness meter (not shown), the upper wafer W is ground to a required thickness.

Next, the rotary table 71 is rotated to move the combined wafer T to the processing position A2. Then, the rear surface Wb of the upper wafer W is ground to an intermediate level by the intermediate grinding unit 90 (process E8 of FIG. 13). At this time, while measuring the total thickness Ht of the combined wafer T by using a contact type thickness meter (not shown), the upper wafer W is ground to a required thickness, and, thereafter, while measuring the thickness Hw of the upper wafer W by using a non-contact type thickness meter (not shown), the upper wafer W is ground.

Afterwards, the rotary table 71 is rotated to move the combined wafer T to the processing position A3. Then, the rear surface Wb of the upper wafer W is finely ground by the finishing grinding unit 100 (process E9 of FIG. 13). In this finishing grinding, the chuck 72 and the finishing grinding wheel 101 after being subjected to the tilt correction in the process E6 are used. At this time, while measuring the thickness Hw of the upper wafer W by using a non-contact type thickness meter (not shown), the upper wafer W is ground to a required thickness.

Subsequently, the rotary table 71 is rotated to move the combined wafer T to the delivery position A0. At the delivery position A0, the rear surface Wb of the upper wafer W after being ground may be cleaned by a cleaning device (not shown).

The combined wafer T completely processed in the processing apparatus 70 is then transferred to the first cleaning apparatus 50 by the wafer transfer device 60. In the first cleaning apparatus 50, the same cleaning as in the process E1 is performed. That is, in the state that the combined wafer T is held by the holding mechanism 200, the rear surface Wb of the upper wafer W is spin-cleaned by using the cleaning liquid nozzle 210, and the rear surface Sb of the lower wafer S is scrub-cleaned by using the cleaning brush 211 (process E10 of FIG. 13)

Also, in the first cleaning apparatus 50, the same thickness measurement as in the process E2 is performed. That is, the thickness Hw of the upper wafer W is measured at each of the measurement points P1, P2 and P3 by using the partial thickness measurer 220 (process E11 of FIG. 13). The measured thickness Hw (distribution of the thickness Hw) of the upper wafer W is outputted to the control device 110.

Further, in the first cleaning apparatus 50, the cleaning of the combined wafer T in the process E10 and the measurement of the thickness Hw of the upper wafer W in the process E11 are performed in this order. However, from the viewpoint of improving the throughput of the wafer processing, it is desirable that the cleaning of the combined wafer T and the thickness measurement of the upper wafer W are performed in parallel. If, however, the throughput of the cleaning of the combined wafer T does not reduce (does not affect) the throughput of the entire wafer processing, the measurement of the thickness of the upper wafer W may be performed either before or after the cleaning of the combined wafer T.

In the control device 110, based on the distribution of the thickness Hw of the upper wafer W measured in the process E11, the inclination adjuster 74 at the processing position A3 of the processing apparatus 70 is adjusted. Specifically, based on the distribution of the thickness Hw of the upper wafer W after being ground, the parallelism between the surface of the chuck 72 and the surface of the finishing grinding wheel 101 is adjusted such that an upper wafer W to be processed next has a uniform in-plane thickness after it is subjected to the finishing grinding (process E12 of FIG. 13). That is, in the process E12, after the processes E1 to E11 are performed on an $n^{th}$ (n is an integer equal to or larger than 1) combined wafer T, the parallelism between the surface of the chuck 72 and the surface of the finishing grinding wheel 101 at the processing position A3 is adjusted to perform grinding of an $(n+1)^{th}$ combined wafer T (upper wafer W) afterwards.

Thereafter, the combined wafer T is transferred to the etching processing apparatus 30 by the wafer transfer device 40. In the etching processing apparatus 30, a wet etching processing (cleaning processing) is performed on the rear surface Wb of the upper wafer W and the rear surface Sb of the lower wafer S (process E13 of FIG. 13).

Then, the combined wafer T after being subjected to all the required processings is transferred to the cassette C on the cassette placing table 10 by the wafer transfer device 40.

In this way, the series of processes of the wafer processing in the wafer processing system 1 are completed.

Further, in the wafer processing system 1, the processing on the $n^{th}$ combined wafer T and the processing on the $(n+1)^{th}$ combined wafer T may be performed in parallel. In this case, the processes E1 to E11 are performed on the $n^{th}$ combined wafer T, and the tilt correction for the grinding of the $(n+1)^{th}$ upper wafer W is performed in the process E12. Meanwhile, the processes E1 to E5 are performed on the $(n+1)^{th}$ combined wafer T, and the tilt correction for the grinding of the $(n+1)^{th}$ upper wafer W is performed in the process E6. In this way, in the process E12 for the $n^{th}$ combined wafer T and in the process E6 for the $(n+1)^{th}$ combined wafer T, the tilt correction for the grinding of the $(n+1)^{th}$ upper wafer W is performed. Therefore, in this case, based on the thickness Hw of the $n^{th}$ upper wafer W measured in the process E11 and the thickness Hs of an $(n+1)^{th}$ lower wafer S calculated in the process E5, the parallelism between the surface of the chuck 72 and the surface of the finishing grinding wheel 101 at the processing position A3 is adjusted.

According to the alignment apparatus 52 of the above-described exemplary embodiment, since the chuck 300 holding the central portion of the combined wafer T is provided with the notch portion 301 extending in the diametrical direction from the center to the outer end of the chuck 300 to receive therein the total thickness measurer 330 which is advanced thereinto and retreated therefrom, the above-described process E4 can be performed. That is, as shown in FIG. 12A, in the state that the lower sensor 332 is advanced into the notch portion 301 and the rotation of the chuck 300 is stopped, the total thickness Ht of the combined wafer T at the measurement point P1 is measured. Further, as shown in FIG. 12B and FIG. 12C, in the state that the lower sensor 332 is retreated from the notch portion 301 and the chuck 300 is being rotated, the total thickness Ht of the combined wafer T at the measurement points P2 and P3 is measured. Therefore, the total thickness Ht of the combined wafer T can be measured at the multiple points.

Furthermore, in the present exemplary embodiment, since the parallelism between the surface of the chuck 72 and the surface of the finishing grinding wheel 101 is adjusted in the process E6 based on the thickness Hs of the lower wafer S calculated in the process E5, the in-plane thickness of the upper wafer W after being subjected to the finishing grinding can be made uniform.

In addition, in the present exemplary embodiment, since the measurement of the total thickness Ht of the combined wafer T in the process E4 is performed by the alignment apparatus 52, an additional measuring device is not provided. Therefore, the configuration of the wafer processing system 1 can be simplified, and equipment costs can be reduced.

Furthermore, in the present exemplary embodiment, since the measurement of the total thickness Ht of the combined wafer T in the process E4 is performed by the alignment apparatus 52, it is possible to suppress a positional displacement of the combined wafer T that may be caused when the combined wafer T is transferred between devices in the case where a thickness measuring device is separately provided.

Further, in the above-described exemplary embodiment, the partial thickness measurer 220 is provided in each of the first cleaning apparatus 50 and the second cleaning apparatus 51, and the total thickness measurer 330 is provided in the alignment apparatus 52. However, the apparatuses in which the partial thickness measurer 220 and the total thickness measurer 330 are provided are not limited thereto. By way of example, the partial thickness measurer 220 may be provided in the alignment apparatus 52, and the total thickness measurer 330 may be provided in the second cleaning apparatus 51.

Moreover, in the above-described exemplary embodiment, although the total thickness measurer 330 is provided in the alignment apparatus 52, the apparatus in which this total thickness measurer 330 is provided is not limited thereto. For example, in an apparatus configuration of the wafer processing system 1, when a temporary placement table (buffer) for the combined wafer T is provided, the total thickness measurer 330 may be provided in the temporary placement table.

Alternatively, both the partial thickness measurer 220 and the total thickness measurer 330 may be provided in an one alignment apparatus 520, and the thickness Hw of the upper wafer W in the combined wafer T before being ground and the total thickness Ht of the combined wafer T including this upper wafer W may be measured in the one alignment apparatus 520. Further, the wafer processing system 1 may be further equipped with another alignment apparatus 530 having the partial thickness measurer 220 configured to measure the thickness Hw of the upper wafer W in the combined wafer T after being ground. In this case, the one alignment apparatus 520 and the another alignment apparatus 530 may be stacked with the first cleaning apparatus 50 and the second cleaning apparatus 51 in the second processing block G2.

Hereinafter, a configuration example of the one alignment apparatus and the another alignment apparatus will be described with reference to the accompanying drawings. In the configuration of the one alignment apparatus and the another alignment apparatus, parts having substantially the same functions and configurations as those of the alignment apparatus 52 shown in FIG. 9 and FIG. 10 will be assigned same reference numerals, and redundant description thereof will be omitted.

Figure 14:
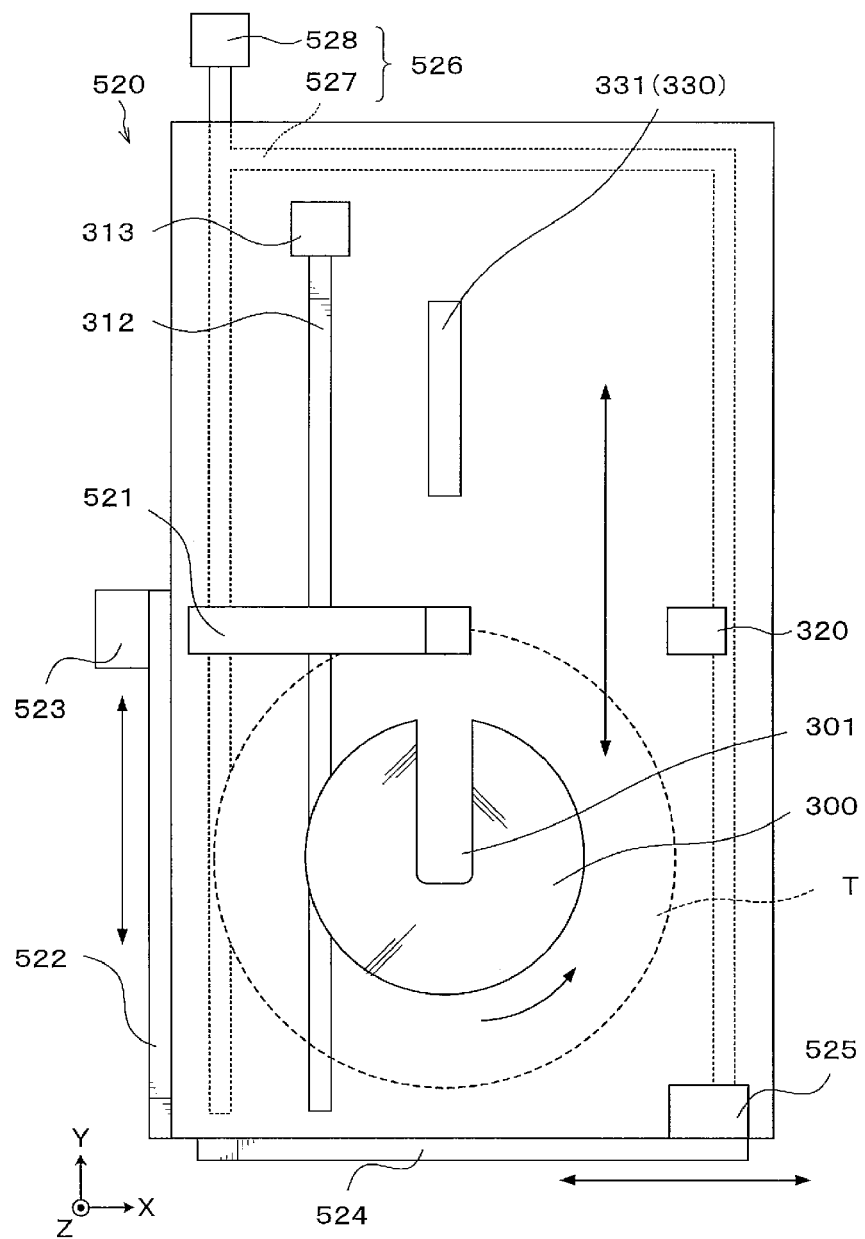
FIG. 14 is a plan view illustrating a configuration of an alignment apparatus according to another exemplary embodiment.
Figure 15:
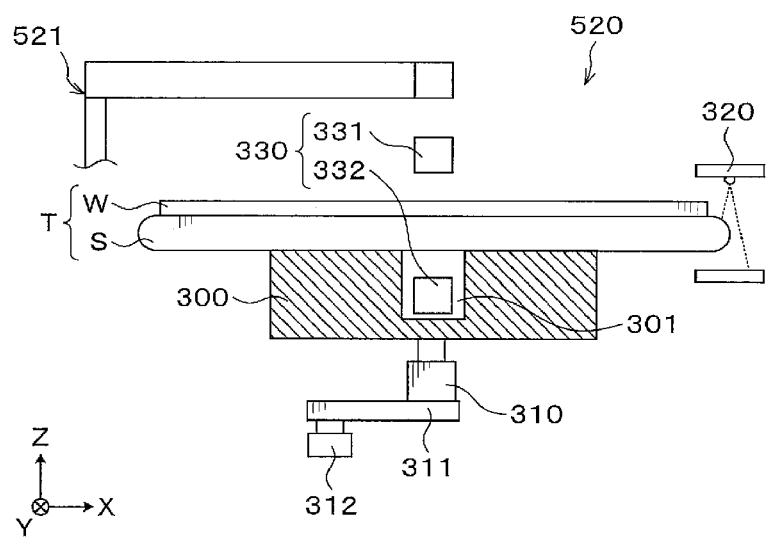
FIG. 15 is a side view illustrating the configuration of the alignment apparatus according to the another exemplary embodiment.

As depicted in FIG. 14 and FIG. 15, the one alignment apparatus 520 has a chuck 300 configured to hold the combined wafer T. This chuck 300 has the same configuration as the chuck 300 provided in the alignment apparatus 52 shown in FIG. 9. That is, the diameter of the chuck 300 is, for example, less than a half of the diameter of the combined wafer T, and a notch portion 301 is formed from a center of the chuck 300 to an outer end thereof to receive a lower sensor 332 of a total thickness measurer 330 that is advanced thereinto and retreated therefrom. In addition, the chuck 300 is configured to be rotatable about a vertical axis by a rotating mechanism 310 and is supported by a supporting member 311 so as to be movable in a horizontal direction along a rail 312 by a moving mechanism 313.

A detector 320 is provided on a lateral side (positive X-axis side) of the chuck 300. This detector 320 has the same configuration as the detector 320 provided in the alignment apparatus 52, and serves to adjust the direction and the position of the combined wafer T before being ground in the horizontal direction.

Above and below the chuck 300, there is provided a total thickness measurer 330. This total thickness measurer 330 also has the same configuration as the total thickness measurer 330 provided in the alignment apparatus 52. The total thickness measurer 330 has an upper sensor 331 and the lower sensor 332. Each of the upper sensor 331 and the lower sensor 332 is moved relative to the chuck 300 as the chuck 300 is moved in the horizontal direction. Further, the lower sensor 332 is configured to be moved forward and backward relative to the notch portion 301.

Further, in addition to the components of the alignment apparatus 52, a partial thickness measurer 521 is further provided above the chuck 300. A configuration of the partial thickness measurer 521 is the same as that of the partial thickness measurer 220 provided in the first cleaning apparatus 50 shown in FIG. 5 and FIG. 6. That is, the partial thickness measurer 521 has a partial thickness sensor configured to measure the thickness of the upper wafer W without coming to contact with it. This partial thickness measurer 521 is configured to measure the thickness Hw of the upper wafer W based on reflection light of light, the light being radiated to the upper wafer W, reflected from the surface Wa of the upper wafer W and reflection light reflected from the rear surface Wb thereof.

As shown in FIG. 14, in the one alignment apparatus 520, the detector 320 and the partial thickness sensor of the partial thickness measurer 521 are disposed at the same position in the Y-axis direction (a driving direction of the chuck 300). Accordingly, at an alignment position of the combined wafer T by the detector 320, the measurement of the thickness Hw at the central portion of the upper wafer W by the partial thickness measurer 521 can be performed simultaneously or continuously. Therefore, the time required for the wafer processing in the partial thickness measurer 521 can be shortened.

Moreover, as shown in FIG. 14, a first shutter 522 is provided at a side wall surface on the negative X-axis side of the one alignment apparatus 520. The first shutter 522 is configured to open/close a transfer opening for the combined wafer T by a driving mechanism 523. As the first shutter 522 is opened, the inside of the one alignment apparatus 520 communicates with the inside of the first processing block G1, and a carry-in/out of the combined wafer T by the wafer transfer device 40 is performed.

Further, a second shutter 524 is provided at a side wall surface on the negative Y-axis side of the one alignment apparatus 520. The second shutter 524 is configured to open/close a transfer opening for the combined wafer T by a driving mechanism 525. As the second shutter 524 is opened, the inside of the one alignment apparatus 520 communicates with the inside of the second processing block G2, and a carry-in/out of the combined wafer T by the wafer transfer device 60 is performed.

An exhaust unit 526 is connected to a lower portion of the one alignment apparatus 520. The exhaust unit 526 has an exhaust path 527 provided below a driving member such as a rail 312; and an exhaust mechanism 528 such as a vacuum pump connected to the exhaust path 527. The exhaust unit 526 is configured to discharge particles or the like generated by the driving such as the rotation and the movement of the chuck 300 to the outside of the one alignment apparatus 520 through an operation of the exhaust mechanism 528.

In addition, the exhaust unit 526 is configured to capable of evacuating (decompressing) a processing space of the one alignment apparatus 520. An internal pressure of the one alignment apparatus 520 is controlled to be maintained at a pressure lower than that of the first processing block G1 and higher than that of the second processing block G2. In other words, in the one alignment apparatus 520, an air flow is introduced from the first processing block G1 when the first shutter 522 is open, and is exhausted to the second processing block G2 when the second shutter 524 is open. As a result, the particles or the like generated by the grinding processing in the processing apparatus 70 is suppressed from being flown into the one alignment apparatus 520, and also suppressed from being flown to the first processing block G1 (cassette C), which is a clean space.

Figure 16:
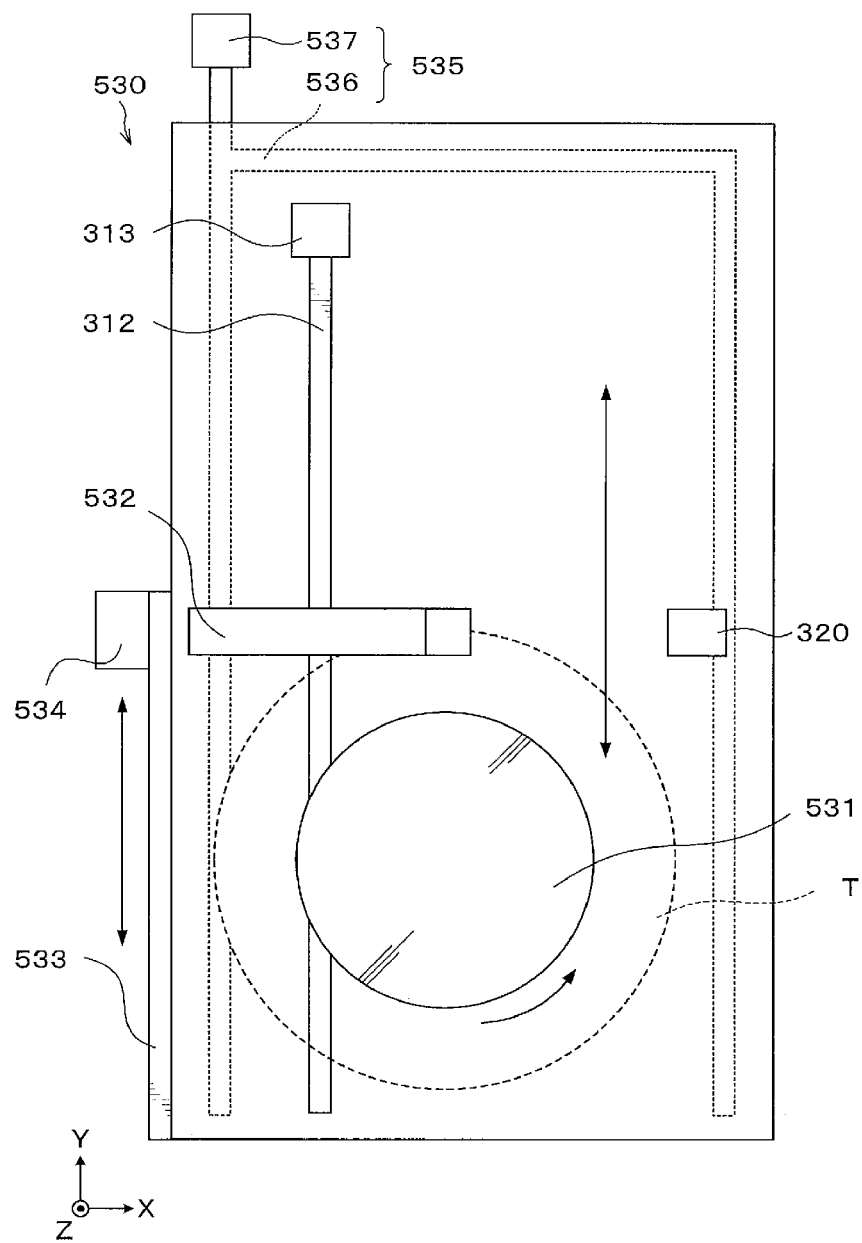
FIG. 16 is a plan view illustrating a configuration of an alignment apparatus according to yet another exemplary embodiment.
Figure 17:
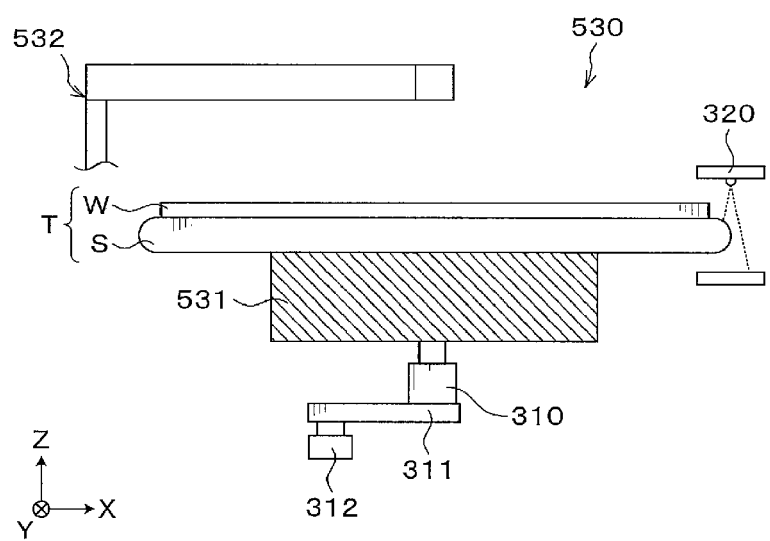
FIG. 17 is a side view illustrating the configuration of the alignment apparatus according to the yet another exemplary embodiment.

Now, a configuration of the another alignment apparatus 530 will be described. As shown in FIG. 16 and FIG. 17, the another alignment apparatus 530 has a chuck 531 configured to hold the combined wafer T. The chuck 531 is configured to attract and hold the central portion of the rear surface Sb of the lower wafer S of the combined wafer T. Further, the diameter of the chuck 531 may be larger than the diameter of the chuck 300 belonging to the one alignment apparatus 520 and equal to or larger than half the diameter of the combined wafer T.

In the another alignment apparatus 530, measurement of the thickness Hw of the upper wafer W after being ground, that is, the thickness Hw smaller than the thickness Hw of the upper wafer W before being ground measured in the one alignment apparatus 520 is carried out. Therefore, by attracting and holding the combined wafer T with the chuck 531 having a larger diameter than the chuck 300 in this way, the combined wafer T thinned by the grinding is suppressed from being bent.

The chuck 531 is configured to be rotatable about a vertical axis by a rotating mechanism 310, supported by a supporting member 311, and movable in a horizontal direction along the rail 312 by a moving mechanism 313. Further, a detector 320 is provided on a lateral side (positive X-axis side) of the chuck 531 to adjust a direction and a position of the ground combined wafer T in the horizontal direction, and, also, to detect the position of the center of the upper wafer W. Furthermore, in the another alignment apparatus 530, although the direction and the position of the ground combined wafer T in the horizontal direction are adjusted by the detector 320, this adjustment of the direction and the position of the combined wafer T in the horizontal direction by the detector 320 may be omitted when there occurs no deviation in the direction and the position of the combined wafer T in the horizontal direction in the grinding processing and the transfer of the combined wafer T.

Above the chuck 531, there is provided a partial thickness measurer 532 configured to measure the thickness Hw of the upper wafer W after being ground. This partial thickness measurer 532 has the same configuration as the partial thickness measurer 521 provided in the one alignment apparatus 520. However, in the another alignment apparatus 530, since the measurement of the thickness Hw of the upper wafer W after being ground, that is, the thickness Hw smaller than the thickness Hw of the upper wafer W before being ground measured in the one alignment apparatus 520 is performed, the partial thickness measurer 532 is provided with a partial thickness sensor configured to measure a thickness smaller than that can be measured by the partial thickness measurer 521.

Moreover, as illustrated in FIG. 16, in the another alignment apparatus 530, the detector 320 and the partial thickness sensor of the partial thickness measurer 532 are disposed at the same position in the Y-axis direction (the driving direction of the chuck 531). Accordingly, at an alignment position of the combined wafer T by the detector 320, the measurement of the thickness Hw at the central portion of the upper wafer W by the partial thickness measurer 532 can be performed simultaneously or continuously. Therefore, the time required for the wafer processing in the partial thickness measurer 532 can be shortened.

In addition, as described above, in the another alignment apparatus 530, the measurement of the total thickness Ht of the combined wafer T is not performed. For this reason, the total thickness measurer 330 is not provided in the another alignment apparatus 530, unlike in the one alignment apparatus 520. Further, since the total thickness measurer 330

(lower sensor 332) is not provided in the another alignment apparatus 530, the chuck 531 may not need to have a notch portion for receiving the lower sensor 332 advanced thereinto.

Further, as shown in FIG. 16, a shutter 533 is provided at a side wall surface of the another alignment apparatus 530. The first shutter 533 is configured to open/close a transfer opening for the combined wafer T by a driving mechanism 534. As the first shutter 533 is opened, the inside of the another alignment apparatus 530 communicates with the inside of the first processing block G1, and a carry-in/out of the combined wafer T by the wafer transfer device 40 is performed.

Furthermore, in the another alignment apparatus 530, a carry-in/out of the combined wafer T by the wafer transfer device 60 of the second processing block G2 is not performed, but the carry-in/out of the combined wafer T only by the wafer transfer device 40 of the first processing block G1 is performed. That is, the another alignment apparatus 530 is not provided with a transfer opening for the combined wafer T on the side of the second processing block G2, and is not provided with a second shutter on the side of the second processing block G2, either. Although the thickness Hw of the upper wafer W after being ground is measured in the another alignment apparatus 530 as described above, the particles or the like generated by the grinding processing in the processing apparatus 70 are suppressed from being flown into the another alignment apparatus 530 by not providing the second shutter on the side of the second processing block G2 and performing the carry-in/out of the combined wafer T only by the wafer transfer device 40.

Additionally, an exhaust unit 535 is provided below the another alignment apparatus 530. The exhaust unit 535 has an exhaust path 536 and an exhaust mechanism 537 such as a vacuum pump. Accordingly, particles or the like generated by, for example, the rotation of the chuck 531 or the movement of the chuck 531 in the horizontal direction can be exhausted to the outside of the another alignment apparatus 530, and an internal pressure of the another alignment apparatus 530 can be reduced. The internal pressure of the another alignment apparatus 530 is controlled to be maintained at a pressure lower than the internal pressure of the first processing block G1, for example. In other words, in the another alignment apparatus 530, an air flow is introduced from the first processing block G1 when the first shutter 533 is open, while the particles or the like is suppressed from being flown to the first processing block G1 (cassette C) which is the clean space.

The one alignment apparatus 520 and the another alignment apparatus 530 are configured as described above. In this way, the measurement of the thickness Hw of the upper wafer W before and after being ground and the total thickness Ht of the combined wafer T may be respectively performed in the one alignment apparatus 520 and the another alignment apparatus 530 that are separately provided outside the processing apparatus 70. In this case, each the one alignment apparatus 520 and the another alignment apparatus 530 may function as a "thickness measuring device" according to the present disclosure.

Further, as described above, when there occurs no deviation in the direction and the position of the combined wafer T in the horizontal direction during the grinding processing and the transfer of the combined wafer T, the adjustment of the direction and the position of the combined wafer T in the horizontal direction in the another alignment apparatus 530 may be omitted. When it is apparent that no deviation occurs in the direction and the position of the combined wafer T in the horizontal direction in this way, the detector 320 may be not provided in the another alignment apparatus 530. In other words, in the wafer processing system 1, a thickness measuring device configured to measure the thickness Hw of the upper wafer W in the combined wafer T after being ground may be separately disposed.

Additionally, the wafer processing system 1 according to the above exemplary embodiment has been described for the case where the upper wafer W is thinned by being ground in the combined wafer T in which the upper wafer W and the lower wafer S are bonded to each other. However, the upper wafer W to be thinned does not have to be bonded to the lower wafer S.

The exemplary embodiments disclosed herein are illustrative in all aspects and do not limit the present disclosure. The above-described exemplary embodiments may be omitted, replaced and modified in various ways without departing from the scope and the spirit of the appended claims.

According to the exemplary embodiments, it is possible to measure the thickness of the substrate appropriately at the multiple points in the diametrical direction of the substrate.

We claim:

1. A thickness measuring device configured to measure a thickness of a substrate, comprising:
   a substrate holder configured to hold the substrate, the substrate holder having a diameter equal to or less than a half of a diameter of the substrate;
   a measurer configured to measure the thickness of the substrate held by the substrate holder;
   a moving mechanism configured to move the substrate holder such that the substrate holder moves relatively with respect to the measurer in a horizontal direction;
   a rotating mechanism configured to rotate the substrate holder; and
   a controller and a storage storing a computer program, wherein the storage and the computer program are configured, with the controller, to control the substrate holder, the measurer, the moving mechanism and the rotating mechanism,
   wherein the measurer comprises:
   an upper sensor disposed above the substrate held by the substrate holder, and configured to measure a distance to a top surface of the substrate; and
   a lower sensor disposed below the substrate held by the substrate holder, and configured to measure a distance to a bottom surface of the substrate,
   wherein the substrate holder is provided with a notch portion which extends in a diametrical direction from a center of the substrate holder to an outer end thereof, and the lower sensor is configured to be relatively advanced into the notch portion or retreated from the notch portion, and
   wherein the controller is configured to perform:
   a control of measuring the thickness of the substrate at multiple points in the diametrical direction by using the measurer;
   a control of measuring the thickness of the substrate at a center thereof in a state that the lower sensor is advanced into the notch portion and a rotation of the substrate holder is stopped; and
   a control of measuring, at plural points in a circumferential direction of the substrate, the thickness of the substrate at a position located at a distance of one half of a radius from the center of the substrate in a state that the lower sensor is retreated from the notch portion and the substrate holder is rotated by the rotating mechanism.

2. The thickness measuring device of claim 1,
wherein the controller is configured to perform a control of calculating a moving average value or a moving median value of the thicknesses measured at the plural points of the outer periphery of the substrate in the circumferential direction.

3. The thickness measuring device of claim 1,
wherein the upper sensor and the lower sensor are disposed to face each other.

4. The thickness measuring device of claim 1,
wherein the substrate is a combined substrate in which a first substrate and a second substrate are bonded to each other, and
the measurer measures a total thickness of the combined substrate.

5. The thickness measuring device of claim 1,
wherein the substrate is a combined substrate in which a first substrate and a second substrate are bonded to each other, and
the measurer is equipped with a partial thickness measurer configured to measure a thickness of the first substrate in the combined substrate.

6. A thickness measuring method of measuring a thickness of a substrate by using a thickness measuring device,
wherein the thickness measuring device comprises:
a substrate holder configured to hold the substrate, the substrate holder having a diameter equal to or less than a half of a diameter of the substrate;
a measurer configured to measure the thickness of the substrate held by the substrate holder; and
a moving mechanism configured to move the substrate holder such that the substrate holder moves relatively with respect to the measurer in a horizontal direction; and
a rotating mechanism configured to rotate the substrate holder,
wherein the measurer comprises:
an upper sensor disposed above the substrate held by the substrate holder, and configured to measure a distance to a top surface of the substrate; and
a lower sensor disposed below the substrate held by the substrate holder, and configured to measure a distance to a bottom surface of the substrate,
wherein the substrate holder is provided with a notch portion which extends in a diametrical direction from a center of the substrate holder to an outer end thereof, and the lower sensor is configured to be relatively advanced into the notch portion or retreated from the notch portion, and
wherein the thickness measuring method comprises:
measuring the thickness of the substrate at multiple points in the diametrical direction by using the measurer;
measuring the thickness of the substrate at a center thereof in a state that the lower sensor is advanced into the notch portion and a rotation of the substrate holder is stopped; and
measuring, at plural points in a circumferential direction of the substrate, the thickness of the substrate at a position located at a distance of one half of a radius from the center of the substrate in a state that the lower sensor is retreated from the notch portion and the substrate holder is rotated by the rotating mechanism.

7. The thickness measuring method of claim 6, further comprising:
calculating a moving average value or a moving median value of the thicknesses measured at the plural points of the outer periphery of the substrate in the circumferential direction.

8. The thickness measuring method of claim 6,
wherein
a total thickness of the substrate is measured based on a measurement result of the upper sensor and a measurement result of the lower sensor.

9. The thickness measuring method of claim 8,
wherein the upper sensor and the lower sensor are disposed to face each other.

10. The thickness measuring method of claim 8,
wherein the substrate is a combined substrate in which a first substrate and a second substrate are bonded to each other, and
a total thickness of the combined substrate is measured by the measurer.

11. The thickness measuring method of claim 6,
wherein the substrate is a combined substrate in which a first substrate and a second substrate are bonded to each other,
the measurer is equipped with a partial thickness measurer configured to measure a thickness of the first substrate in the combined substrate, and
the thickness of the first substrate in the combined substrate is measured by the measurer.

* * * * *